Oct. 8, 1940.　　　　J H. HUNT ET AL　　　　2,217,116

VEHICLE WHEEL

Filed July 25, 1939

INVENTOR.
J HAROLD HUNT
and
BY　HARRY J. HORN

ATTORNEY.

Patented Oct. 8, 1940

2,217,116

UNITED STATES PATENT OFFICE 2,217,116

VEHICLE WHEEL

J Harold Hunt and Harry J. Horn, Lansing, Mich., assignors to Motor Wheel Corporation, Lansing, Mich., a corporation of Michigan Application July 25, 1939, Serial No. 286,352

6 Claims. (Cl. 301—108)

This invention relates to vehicle wheels, and more particularly to wheels of the pressed metal type adapted to accommodate exceptionally large hub caps.

In recent years there has been a marked tendency to increase the size of hub caps on automobile wheels. This tendency gives rise to new problems in the design of wheels adapted to receive such large hub caps. One of these problems arises in the location and attachment of the clips for securing the hub caps to the wheels.

The conventional type of wheel body is usually equipped with a plurality of resilient metal clips secured by rivets or similar fastening devices to the bolting on flange of the wheel body. The bolting on flange of the wheel is not subject to flexing during rotation of the wheel on the vehicle, so that the weakening effect of the rivet holes had no effect on the strength of the wheel under load.

When a large hub cap is employed on a wheel having the clips attached to the bolting on flange, the rim of the hub cap is located a relatively great distance from the attaching portions of the clips, thereby requiring either the use of clips which are abnormally long and therefore too flexible, or the use of special, and relatively costly fastening devices on the wheel, hub cap, or both.

In order to use ordinary securing clips which are quite cheap, they must be moved out on the wheel body to points adjacent the hub cap periphery. However, it has been found that this procedure creates additional problems. One problem is the natural weakening effect of rivet holes in the wheel body. It was found that rivet holes in the convex nose, and in fact in any portion of the wheel body which is subject to flexing but which has a relatively small area, soon caused the wheel body to crack. Another problem is the necessity in a wheel having a curved outer face of punching or drilling each rivet hole separately because the attaching portion of each clip had to be seated on the wheel in a different plane.

This invention eliminates the objections to relocating the clips and their attaching rivet holes, by placing them in a zone in which the flexing stresses are distributed substantially uniformly over a large area, so that the stresses are not localized sufficiently to break the wheel at the rivet holes. In addition, the wheel is strengthened locally about the rivet holes by means of pressed deformations in the wheel body. These deformations do not act as ribs to stiffen the entire wheel, or even a fairly large portion thereof, but merely to carry the stresses in the wheel around the rivet holes. In addition, the deformations overcome the other problem by providing clip seats in a single plane, thus allowing clip securing rivet holes to be punched in one operation, as well as furnishing flat seats for the clips. The sides of the deformations prevent rotation of the clips if each is fastened with a single rivet.

Reducing the invention to its basic essentials, it consists of a wheel in which the clips are located outwardly of the bolting on flange, the rivet holes are placed in a flexible zone of great flexing area at points remote from the bolting on flange and rim, and spaced from the convex nose. The invention also includes the provision of deformations about the rivet holes as clip seats, each having a surface in a substantially common radial plane.

An object of the invention is the provision of a wheel having an improved appearance due to the use of an oversize hub cap. Another object of the invention is the provision of hub cap securing clips located so as not to weaken the wheel and in a position to attach the hub cap with a minimum of parts. A further object is to provide a wheel and cover of simplified design and employing a minimum of material. A still further object of the invention is the provision of means for the easy attachment of the hub cap securing clips to the wheel.

These objects and others ancillary thereto will become more apparent in the following specification when read in connection with the accompanying drawing, in which—

Figure 1:
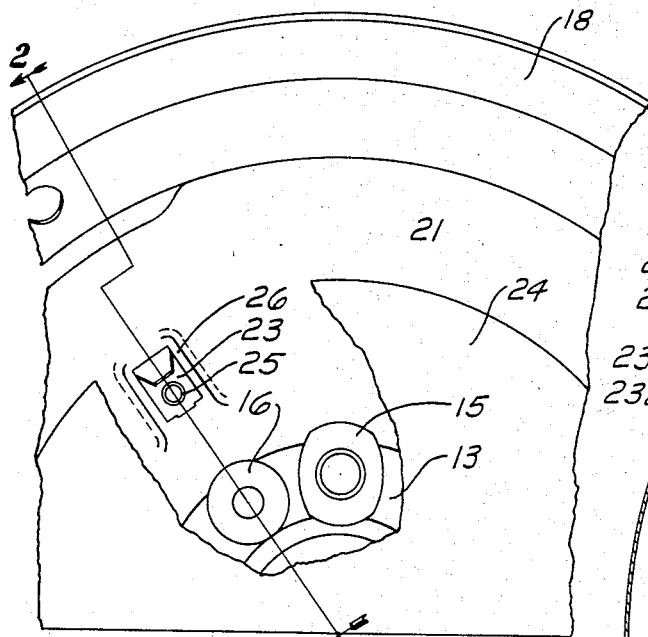
Figure 1 is a fragmentary elevational view of a wheel embodying the invention, with a portion of the hub cap broken away to show the construction of the central portion of the wheel.
Figure 2:
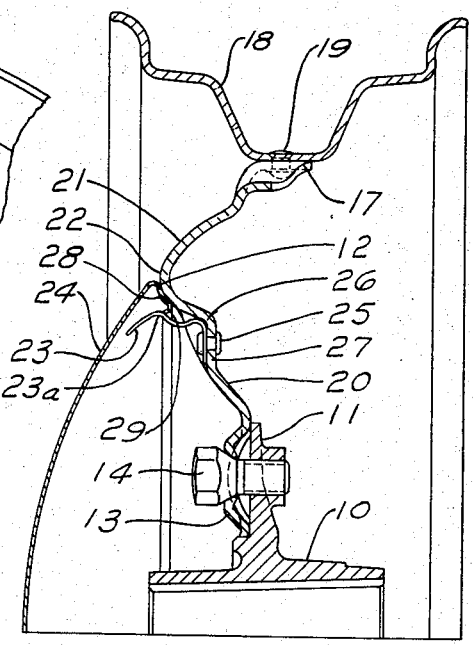
Figure 2 is a cross-sectional view taken on substantially the line 2—2 of Figure 1.

The invention disclosed in Figures 1 to 4 is embodied in a wheel which includes a hub 10, having a radial flange 11. A wheel body 12 having a substantially radially extending bolting on flange 13 is secured to the flange 11 of the hub by means of a plurality of cap screws 14. It will be noted that the bolting on flange 13 is provided with a plurality of outwardly pressed bosses 15 and 16. The bosses 15 are apertured to receive the cap screws 14 and are employed to give a slight amount of resiliency to the bolting on flange about the cap screw holes. This allows the flange to flex when the cap screws are threaded home and prevents accidental dislodgment of the cap screws. The bosses 16 are apertured to receive a pilot pin and are pressed outwardly in order to clear the heads of the rivets which are used to attach a brake drum, not shown, to the flange 11.

A conventional drop center rim 18 is secured to the flanges 17 at the radial outer extremities of the four spoke portions of the wheel body, by means of rivets 19.

Intermediate the spoke portions and the bolting on flange, the wheel body is pressed outwardly to form two coaxial substantially frusto-conical and oppositely converging portions 20 and 21, respectively, forming a nose 22 therebetween. The portion 20 is so shaped and of such dimensions that it is flexible throughout its extent from the bolting on flange 13 to the nose 22. In the construction shown, substantially all of the flexing of the wheel under load takes place within the limits of portion 20. In this construction, portion 21 is relatively rigid. Portion 20 is substantially greater in radial width than portion 21.

Located at points intermediate the nose 22 and the bolting on flange, or within the flexible portion 20, are a plurality of spring clips 23 of conventional form having humps 23a thereon for the attachment of a hub cap 24. The exact location will vary depending upon the diameter of the hub cap which they are to engage. The spring clips 23 are attached to the wheel body by means of rivets 25 which are received in apertures formed in the wheel body for that purpose.

Locally about the apertures which receive the rivets 25, the wheel body is pressed inwardly to provide deformations 26. These deformations are so formed that their inner faces 27 are all in substantially the same radial plane. The formation of the faces 27 in substantially a common plane allows all of the apertures for the rivets to be formed at one time, and also provides a solid support for the spring clips 23. In addition, the side walls of the deformation prevent rotation of the spring clips if a single rivet is used to fasten each clip to the wheel body. While the deformations 26 do reinforce the wheel locally, they do not act as ribs for stiffening the entire portion 20.

The hub cap 24 is of conventional construction and of a size locating its periphery adjacent the nose 22. It is provided at its periphery with an inturned flange 28 and a bead 29 at the extreme edge which snaps over the humps on the spring clips 23.

Figures 5, 6:
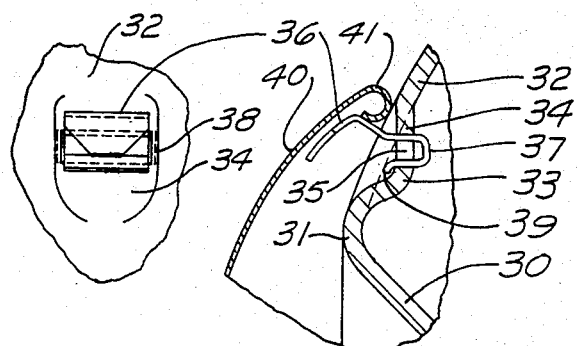
Figure 5 is a fragmentary cross-sectional view similar to Figure 3 but showing a modified form of the invention.
Figure 6 is a fragmentary elevational view of the modification shown in Figure 5 with the hub cap removed.
Figure 3:
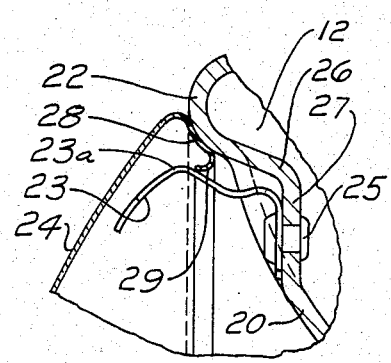
Figure 3 is a fragmentary sectional view similar to Figure 2 but showing the hub cap securing clip and adjacent portions of the wheel on a large scale.
Figure 4:
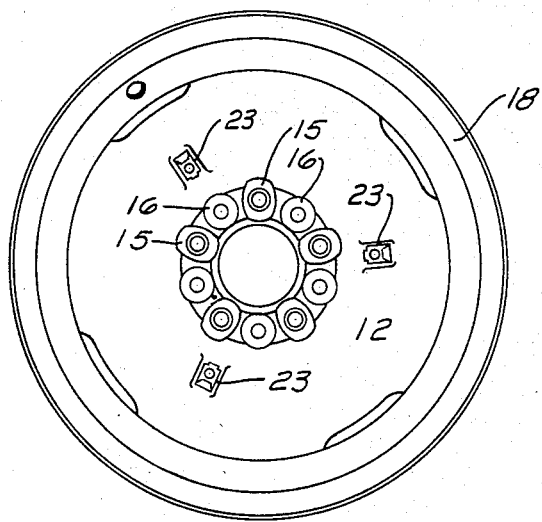
Figure 4 is an elevational view of the wheel with the hub cap removed.

The construction shown in Figures 5 and 6 is an adaptation of the invention to wheels of a type wherein the zone radially outward of the nose is of greater radial extent than the portion between the nose and the bolting on flange. The radially outward portion of this wheel is more flexible than the corresponding portion of the wheel shown in Figures 1 to 4.

In this construction the wheel body is designated generally by the numeral 30. It is provided with a convex nose 31 and a flexible portion 32 radially outwardly of the nose. Spaced just outwardly of the nose 31 are a plurality of angularly spaced deformations, the radially extending surfaces 34 of which are apertured at 35 to receive the fastening means for the hub cap securing clips 36.

In this modification, however, the clips 36 are provided with integral fastening means. The inner end of the clips are bent into U-shape, as shown at 37, and the edges of the base of the U have laterally extending tongues 38 which, together with the base of the U, are wider than the width of the aperture 35. The clips 38 are inserted in the openings 35 by compressing the side walls of the U together and inserting the clip through the aperture from the interior of the wheel. After the clip is in place, the tongues 38 prevent removal from the wheel in one direction, and a tongue 39 at the free end of the short leg of the U prevents removal in the other direction. A hub cap 40 of conventional shape having a peripheral bead 41 is snapped over the clips 36 in the usual manner.

From the foregoing it will be seen that this invention provides an economical and simple method of attaching hub caps of large size to vehicle wheels. It must be again pointed out, however, that in both modifications which are shown in this application the apertures for the reception of the clip securing devices are located in a flexible zone of the wheel body of substantially great area, and at points spaced from the nose of the wheel body. If not placed in this manner the wheel is very likely to fail due to the weakening of the wheel by the rivet apertures.

Nothing herein contained is to be understood as indicating that attaching clips cannot or should not be located in any relatively rigid portion of a wheel. The discovery which applicants have made and which forms the basis of the present invention is that if the clips are to be located in a flexible portion of the wheel body, that portion must be of relatively great area. Negatively stated, the attaching clips must not be located in a flexible portion of the wheel which is of relatively small area.

It will be evident that the invention is susceptible of many variations, and consequently, the scope of the invention is to be limited only by the appended claims.

We claim:

1. A vehicle wheel including a pressed metal wheel body comprising a central bolting on flange and two coaxial, oppositely converging, substantially frusto-conical portions forming a rounded nose therebetween, the radially inner of said portions being joined to said flange, one of said portions having a relatively large area and being flexible throughout substantially its entire extent, and a plurality of angularly spaced deformations of limited radial and circumferential extent in said flexible portion spaced from said nose, each of said deformations having a flat surface lying in a common radial plane to provide a plurality of seats for cover attaching clips.

2. A vehicle wheel including a pressed metal wheel body comprising a central bolting on flange and two coaxial, oppositely converging, substantially frusto-conical portions forming a rounded nose therebetween, the radially inner of said portions being joined to said flange, said inner portion having a radial width substantially greater than the outer portion and being flexible throughout substantially its entire extent, and a plurality of angularly spaced apart recesses of limited radial and circumferential extent in said radially inner portion between said nose and said flange, each of said deformations having a surface lying in a substantially common radial plane to provide seats for cover securing clips, and a cover attaching clip secured to each of said seats.

3. A vehicle wheel including a pressed metal wheel body comprising a central bolting on flange and two coaxial, oppositely converging, substantially frusto-conical portions forming a rounded nose therebetween, the radially inner of said portions being joined to said flange, one of said portions having a radial width substantially greater than the other of said portions and being flexible throughout substantially its entire extent, and a plurality of angularly spaced deformations of limited radial and circumferential extent in said flexible portion spaced from said nose, each of said deformations having a flat surface lying in a substantially common radial plane to provide a plurality of seats for cover attaching clips, and a cover attaching clip secured to each of said seats.

4. A vehicle wheel including a pressed metal wheel body and a plurality of cover attaching clips having base portions secured to the wheel body, said wheel body comprising a central bolting on flange and two co-axial oppositely converging substantially frusto-conical portions forming a rounded nose therebetween, the radially inner of said portions being joined to said flange, one of said portions having a relatively large area and being flexible throughout substantially its entire extent, and a plurality of angularly spaced recesses in said flexible portion spaced from said nose, each of said recesses having a flat bottom surface of substantially the same area as the area of the base of the clips and lying in a common radial plane to provide a plurality of seats for said cover attaching clips.

5. A vehicle wheel including a pressed metal wheel body comprising an annular substantially frusto-conical portion, an axially inwardly depressed recess in said portion, said recess having side walls and a flat, non-circular radially extending bottom wall, and a cover attaching clip having a base positioned in said recess, the area of the base of said clip being substantially the same as the area of said bottom wall.

6. A vehicle wheel including a pressed metal wheel body having an axially inwardly depressed recess therein, said recess having side walls and a flat non-circular bottom wall, and a cover attaching clip having a non-circular base positioned in said recess and secured to said bottom wall, the area of said base being substantially the same as the area of said bottom wall.

J HAROLD HUNT.
HARRY J. HORN.